US011684887B2

(12) United States Patent
Pang et al.

(10) Patent No.: US 11,684,887 B2
(45) Date of Patent: Jun. 27, 2023

(54) CONTAMINATION LIMITER FOR REDUCING OUTGASSED VOLATILE CONDENSABLE MATERIALS FROM EXTERNAL SENSITIVE OPTICAL AND THERMAL SURFACES OF A SPACECRAFT

(71) Applicant: THE BOEING COMPANY, Chicago, IL (US)

(72) Inventors: Anthony Pang, Culver City, CA (US); Julie Xie, Redondo Beach, CA (US); Eleazar P. Lontoc, Irvine, CA (US)

(73) Assignee: THE BOEING COMPANY, Arlington, VA (US)

( * ) Notice: Subject to any disclaimer, the term of this patent is extended or adjusted under 35 U.S.C. 154(b) by 545 days.

(21) Appl. No.: 16/165,752

(22) Filed: Oct. 19, 2018

(65) Prior Publication Data

US 2020/0122079 A1 Apr. 23, 2020

(51) Int. Cl.

*B01D 53/00* (2006.01)
*B01D 53/44* (2006.01)
*B01D 53/82* (2006.01)
*B64G 1/52* (2006.01)

(52) U.S. Cl.

CPC ........... *B01D 53/007* (2013.01); *B01D 53/44* (2013.01); *B01D 53/82* (2013.01); *B64G 1/52* (2013.01); *B01D 2257/708* (2013.01); *B01D 2258/06* (2013.01); *B01D 2259/804* (2013.01)

(58) Field of Classification Search

CPC ...... B01D 53/007; B01D 53/44; B01D 53/82; B01D 2257/708; B01D 2258/06; B01D 2259/804; B64G 1/52

USPC .............................................................. 96/16

See application file for complete search history.

(56) References Cited

U.S. PATENT DOCUMENTS 3,557,534 A * 1/1971 Kennedy .................. B64G 1/46 95/90
4,815,525 A * 3/1989 Readman ............... B64G 1/503 244/172.6
4,861,445 A 8/1989 Champetier
5,685,505 A 11/1997 Meckier (Continued)

FOREIGN PATENT DOCUMENTS

CN 108592226 A * 9/2018 ............. F24F 13/24
JP 2001010600 A 1/2001

(Continued)

OTHER PUBLICATIONS

Extended European Search Report for Application No. 19193500.6-1010 dated Apr. 3, 2020.

(Continued)

*Primary Examiner* — Robert A Hopkins
*Assistant Examiner* — Qianping He
(74) *Attorney, Agent, or Firm* — Patterson + Sheridan, LLP

(57) ABSTRACT

One embodiment includes a contamination limiter for a spacecraft. The contamination limiter includes a body having an interior. An inlet is fluidly coupled to the interior of the body. A collector plate is positioned within the interior of the body. A UV light source is directed at a surface of the collector plate. An exterior vent is fluidly coupled to the interior of the body. A volatile condensable material from the spacecraft is photofixed by the UV light exposure to the collector plate prior to venting through an exterior vent to an exterior of the spacecraft.

20 Claims, 4 Drawing Sheets

(56) References Cited

U.S. PATENT DOCUMENTS

| | | | | |
|---|---|---|---|---|
| 6,117,337 | A | 9/2000 | Gonzalez-Martin et al. | |
| 6,156,212 | A * | 12/2000 | Rader | G01N 1/2211 209/143 |
| 2006/0162564 | A1 * | 7/2006 | Paterson | B03C 3/155 96/55 |
| 2008/0286163 | A1 * | 11/2008 | Garfield | B01J 35/004 422/120 |
| 2009/0010801 | A1 * | 1/2009 | Murphy | B01D 46/10 422/4 |
| 2013/0017135 | A1 * | 1/2013 | Anderson | B01D 53/8668 423/210 |

FOREIGN PATENT DOCUMENTS

| | | | | |
|---|---|---|---|---|
| KR | 2015049247 | A * | 5/2015 | |
| WO | WO-2012091618 | A1 * | 7/2012 | B64G 1/54 |

OTHER PUBLICATIONS

Albyn et al. "Outgassing Measurements Combined with Vacuum Ultraviolet Illumination of the Deposited Materials," Journal of Spacecraft and Rockets, vol. 44, No. 1, Jan.-Feb. 2007, 7 pages.
Stewart et al., "Absolute Rates of Vacuum-Ultraviolet Photochemical Deposition of Organic Films," J. Phys. Chem. 1989, 93, 2393-2400.
Graham S. Arnold and Kenneth Luey, "Photocheinically Deposited Contaminant Film Effects," SPIE vol. 2864, 17 pages.
M.-P. Nghiem, Th. Tondu, J.-F. Roussel, and D. Faye, "Molecular thin film chemical modifications under vacuum ultraviolet irradiation," J. Vac. Sci. Technol. A 28, 119 (2010); doi: 10.1116/1.3271134.
Mark E. Frink, Mark A. Folkman, Lane A. Darnton, "Photodeposition of molecular contaminants with a vacuum ultraviolet solar illumination lamp," Proc. SPIE 1754, Optical System Contamination: Effects, Measurement, Control III, (Dec. 18, 1992): doi: 10.1117/12.140751.
Petro et al.,, "MAVEN Contamination Venting and Outgassing Analysis," IEEE Aerospace Conference, 2014, 13 pages.
European Patent Office, Communication pursuant to Article 94(3) for Application 19193500.6 dated Oct. 20, 2021.

* cited by examiner

CONTAMINATION LIMITER FOR REDUCING OUTGASSED VOLATILE CONDENSABLE MATERIALS FROM EXTERNAL SENSITIVE OPTICAL AND THERMAL SURFACES OF A SPACECRAFT

FIELD

Embodiments of the present disclosure relate to reducing outgassed volatile condensable materials from external surfaces of a spacecraft and more specifically to a contamination limiter for photofixing via electromagnetic radiation exposure, such as ultraviolet (UV) light exposure, of the outgassed volatile condensable materials onto a collector plate prior to external venting of the outgassed volatile condensable materials from the spacecraft.

BACKGROUND

One of the problems encountered in the operation of optical and thermal equipment in a spacecraft is outgas contamination from the spacecraft. Under the high vacuum and extreme temperature conditions existing in outer space, organic materials (such as dielectric materials used to make and package integrated circuits, printed circuit boards, and other electronic assemblies) volatilize and outgas from the spacecraft. The volatized organic materials or volatile condensable materials (VCMs) condense and deposit on exposed surfaces of the spacecraft, such as exposed surfaces of optical and thermal equipment. The resulting deposition of organic materials forms a coating interfering with the performance and lifetime of the spacecraft. The VCM contamination distorts the functioning or reduces the performance and lifetime of solar panels, thermally controlled surfaces, cameras, telescopes, sensors, detectors, mirrors, and the like.

Space centers and agencies have set forth procedures for evaluating and approving organic materials that can be used in spacecrafts to reduce VCM deposits by limiting approved organic materials to those that exhibit a certain amount of outgassing under certain test methods. These approved organic materials raise the manufacturing costs of spacecrafts. Even with using approved organic materials, these approved organic materials do not adequately control VCM contamination of spacecrafts resulting in reduced functioning and lifetime of the spacecrafts. Selective exterior vent paths and structural design have been used in spacecrafts to directionally control VCMs away from sensitive surfaces. However, such designs have limited effectiveness in controlling VCM contamination. Filters with absorbent materials, such as zeolites, have been used to capture outgassed organic materials. However, such filters have limited lifetimes since the absorbent materials may only absorb a limited amount of organic materials resulting in failure or clogging of the filters.

Therefore, there is a need for an improved spacecraft to control outgassed VCM contamination.

SUMMARY

One embodiment includes a contamination limiter for a spacecraft. The contamination limiter includes a body having an interior. An inlet is fluidly coupled to the interior of the body. A collector plate is positioned within the interior of the body. A UV light source is directed at a surface of the collector plate. An exterior vent is fluidly coupled to the interior of the body. A volatile condensable material from the spacecraft is photofixed by the UV light exposure to the collector plate prior to venting through an exterior vent to an exterior of the spacecraft.

One embodiment comprises a spacecraft. The spacecraft includes electronic components disposed in interior compartments of the spacecraft. The electronic components outgas a VCM during space conditions. The spacecraft includes a contamination limiter. The contamination limiter includes a body having an interior. An inlet is fluidly coupled to the interior of the body and fluidly coupled to the interior compartments of the spacecraft. A collector plate is positioned within the interior of the body. A UV light source is directed at a surface of the collector plate to photofix the VCM to the surface of the collector plate. An exterior vent is fluidly coupled to the interior of the body.

One embodiment comprises a method of reducing deposition of a VCM on an exterior surface of a spacecraft. The method includes directing the VCM outgassed from electronic components disposed in an interior of the spacecraft to a collector plate. A UV light is directed to a surface of the collector plate. The VCM is photofixed onto the surface of the collector plate.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The terms "top," "bottom," "over," "under," "between," "on", and other similar terms as used herein refer to a relative position. The relative position of the terms does not define or limit the layers to a vector space orientation.

The term "comprises/comprising" includes the subset meaning of "consists/consisting essentially of" and includes the subset meaning of "consists/consisting of."

In certain embodiments, outgassed VCMs from an interior of a spacecraft are redirected to a contamination limiter. VCMs are contained in the contamination limiter. Ultraviolet light (UV) source causes photofixation of the VCMs within the contamination limiter. The amount of VCMs which are vented outside of the spacecraft is minimized or even eliminated. The contamination limiter enables limited or no VCM contamination of optical, thermal, and/or external surfaces of the spacecraft.

Figure 1:
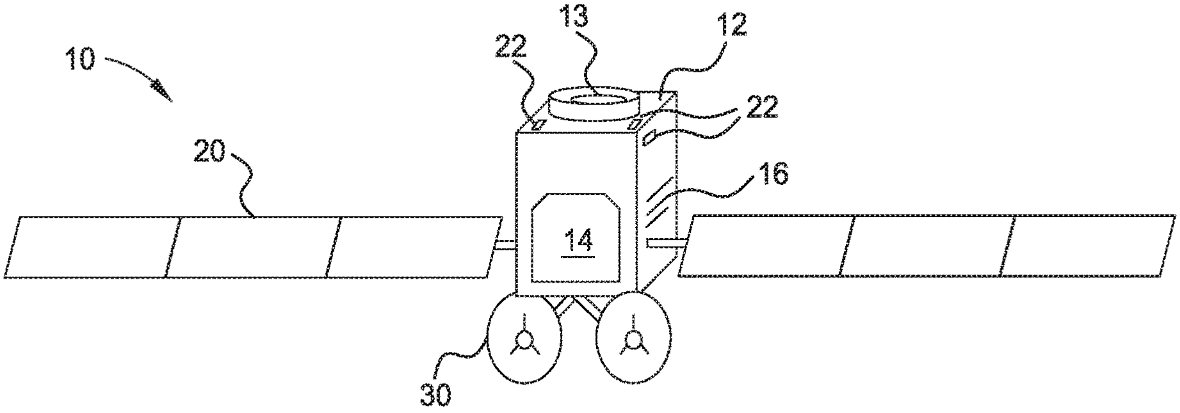
FIG. 1 is a schematic illustration of a three-dimensional view of certain embodiments of a spacecraft.

FIG. 1 is a schematic illustration of a three-dimensional view of certain embodiments of a spacecraft 10, such as a satellite. However, other spacecrafts, including manned spacecrafts, manned orbitals, and unmanned spacecrafts, are contemplated for use according to aspects of the disclosure. As shown in FIG. 1, spacecraft 10 is a satellite in a deployed position. Spacecraft 10 includes a body 12. The body 12 may be rectangular in shape, cylindrical in shape, spherical in shape, polygonal in shape, any suitable shape, and combinations thereof. The spacecraft 10 may take any suitable form and configuration depending on the application of the spacecraft 10. For example, the spacecraft 10 may include an adapter ring 13 for interfacing with a spacecraft bus.

The spacecraft 10 may include one or more thermal controlled surfaces, such as radiators, specialized paints, thermal blankets, mirrored-surfaces, or combinations thereof. The thermal controlled surfaces radiate or reject heat away from the spacecraft 10. For example, a coating or a specialized paint 16 may be applied to the exterior surface of the body 12 to increase the emissivity of the body to solar heat radiation. In another example, the exterior surface of the body 12 may be a mirrored-surface to reflect solar electromagnetic radiation. In another example, a thermal blanket having a mirrored-surface may cover the body 12 to reflect solar electromagnetic radiation. In another example, one or more radiator panels 14 may be mounted to the body 12. A heat source of the spacecraft 10, such as heat generating electronics of the spacecraft 10, may be disposed in close proximity to the radiator panel 14 or coupled to the radiator panel through one or more heat pipes to radiate heat to the radiator panel 14, which in turn radiates the heat to outer space. The heat pipes may contain heat transfer fluid to conduct heat away from heat source to the radiator panel 14. The heat transfer fluids may be circulated within the heat pipe to aid transfer of heat to the radiator panel 14. The radiator panels 14 may optionally be covered by a specialized paint 16, by a thermal blanket, and/or have a mirrored-surface to increase the emissivity of the radiator panels 14.

The spacecraft 10 may include solar panels 20 connected to the body 12 to provide electrical power to the spacecraft 10. The spacecraft 10 may include instruments 22 (including, but not limited to, cameras, telescopes, sensors, mass spectrometers, light spectrometers, ion analyzing instruments, Langmuir probe, magnetometer, sun sensor, earth sensor, and other instruments) to measure, detect, or record conditions in space or objects in space (e.g., the Earth, the Sun, planets, moons, comets, man-made objects, etc.). The instruments 22 may contain lenses, mirrors, and other optical surfaces.

The spacecraft 10 may include one or more antennas 30 connected to the body 12 for transmitting and for receiving data. The antenna may be any suitable antenna, such as reflector antennas, aperture antennas, wire antennas, antenna arrays, helix antennas, and other suitable antennas.

Figure 2:
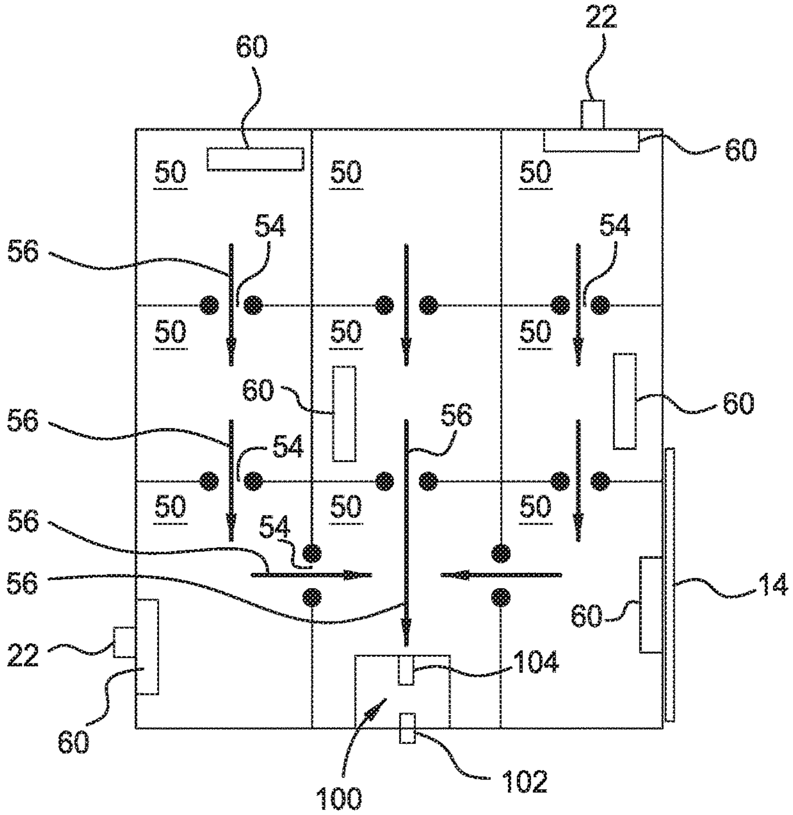
FIG. 2 is a schematic illustration of a cross-sectional view of certain embodiments of a body of a spacecraft including a contamination limiter.

FIG. 2 is a schematic illustration of a cross-sectional view of certain embodiments of a body 12 of a spacecraft including a contamination limiter 100, such as of the spacecraft 10 of FIG. 1 or other types of spacecrafts. The contamination limiter 100 may be disposed in the body 12 or coupled to the exterior surface of the body 12. The contamination limiter 100 has an exterior vent 102 to outer space and an inlet 104 in fluid communication with the interior of the body 12. The body 12 may include a plurality of internal compartments 50 (nine are shown, but more or less are contemplated). Each internal compartment 50 has one or more interior vents 54 forming a vent path 56 directed towards the contamination limiter 100. Each internal compartment 50 may include one or more electronic components 60. For example, the electronic components 60 may include integrated circuits, memory storage devices (i.e., short and/or long term storage devices), processors, controllers, central processing units, printed circuit boards, and other electronic components for operation of the spacecraft. For example, the electronic components 60 may be coupled to solar panels 20, instruments 22, antenna 30, and other spacecraft components of spacecraft 10 of FIG. 1. The electronic components 60 are made of dielectric materials, such as organic or carbon containing materials. The dielectric materials in space environments, such as extreme vacuum and extreme temperature conditions, undesirably produce VCMs. The VCMs are directed by the interior vents 54 and the vent path 56 to the inlet 104 of the contamination limiter 100. The contamination limiter 100 captures a majority of the VCMs produced by the spacecraft 10 before the VCMs are vented to outer space through the exterior vent 102. When the spacecraft 10 includes one contamination limiter 100, the vent paths 56 converge to the contamination limiter 100. If the spacecraft include two or more contamination limiters 100, the vent paths 56 converge to the two or more contamination limiters 100.

Figure 3:
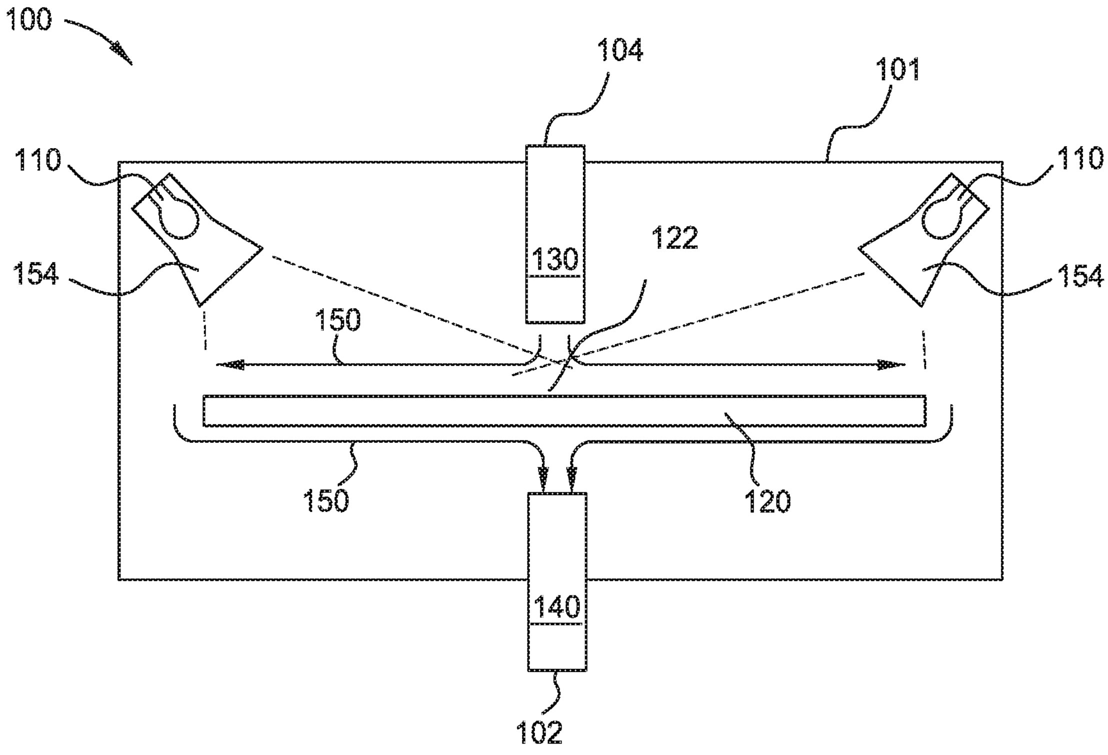
FIG. 3 is a schematic illustration of a cross-sectional view of one embodiment of a contamination limiter.

FIG. 3 is a schematic illustration of a cross-sectional view of one embodiment of a contamination limiter 100, such as the contamination limiter 100 of FIG. 2. The contamination limiter 100 includes a body 101, and one or more UV light sources 110. The UV light source 110 directs a UV light to a collector plate 120. The collector plate 120 is supported within an interior of the body 101, for example, by coupling the collector plate 120 to interior surfaces of the body, or through the use of stands, brackets, or the like.

In certain embodiments, the UV light source 110 may be a UV lamp. For example, the UV lamps may operate under relatively low power, such as in a range from about 30 Watts to about 100 Watts. The UV lamps may provide an electromagnetic radiation in wavelengths in a range from 10 nanometer (nm) to 400 nm, such as wavelengths in a range from 10 nm to 200. In certain embodiments, the UV light source 110 may transmit, direct, or reflect sunlight to the collector plate 120. In such an embodiment, the UV lamps may optionally be included to facilitate redundant UV generation. Alternatively, when directing sunlight to the collector plate 120, UV lamps may be omitted, and sunlight may be utilized as the only source of UV light. Optional optical devices 154, such as mirrors, shutters, lens, reflectors, and/or other devices, may be used to further guide the UV light from the UV light source 110 to the collector plate 120. The optional optical devices 154 may be positioned to direct UV light to preferential locations of the collector plate 120, or to direct UV light in a desired illumination pattern. In some embodiments, the optical devices 154 direct light away from (or obscure light from) internal surfaces of the body 101 of the contamination limiter 100 to mitigated deposition on the internal surfaces.

The contamination limiter 100 may include a collimator 130 or nozzle at inlet 104 of the contamination limiter 100 to direct VCMs into contact with the collector plate 120. The UV light from the UV light source 110 causes photodeposition or photofixing of VCMs to the collector plate 120. The UV light causes the VCMs to polymerize together onto a surface of the collector plate 120. Once VCMs are photofixed to the collector plate 120, additional VCMs are photodeposited or photofixed on top of the VCMs already photofixed to the collector plate 120, thereby greatly increasing the amount of VCMs which can be captured by a single collector plate 120. Once VCMs are photofixed to the collector plate 120, the VCMs are tightly adhered to the collector plate 120 (i.e., including adhering to other VCMs already adhered to the collector plate) and will not further volatize from the collector plate 120. VCMs are cleaved by photolysis or excited from the UV light and react with the collector plate 120 (i.e., including other VCMs already adhered to the collector plate) to form a stable material that is tightly bonded onto the collector plate 120. Therefore, the collector plate 120 has a large capacity to capture the VCMs outgassed from the spacecraft 10 during the lifetime of the spacecraft. The collector plate 120 does not need servicing or replacement during the lifetime of the spacecraft 10. However, it is contemplated that the collector plate 120 may be optionally serviced or replaced, if desired.

The collector plate 120 may be made of a metal (such as aluminum) or any high thermal conductive material that may photofix VCMs thereon. In certain embodiments, the collector plate 120 is roughened or textured to increase the surface area of the collector plate 120. Increased surface area of the collector plate 120 provides for more area for condensation of VCMs thereon. In certain embodiments, the collector plate 120 is roughened or textured to provide UV light trapping to enhance initial deposition of VCMs on the collector plate 120.

In certain embodiments, the collector plate may be passively cooled or actively cooled to enhance photofixing of VCMs to a surface of the collector plate 120. Passive and/or active cooling may be facilitated through use of a cooling channels embedded in the collector plate 120, via heat sinks coupled to the collector plate 120, via increased cooling fluid circulation adjacent the collector plate 120, and the like. A cold collector plate 120 helps to condense VCMs onto a surface of the collector plate 120. A collector plate 120 comprising a metal or another high thermal conductive material helps the transfer of heat from the collector plate 120 during passive or active cooling. In one example, the contamination limiter 100 may be disposed in or on the spacecraft 10 away from heat sources, such as electronic components 60, or away from a radiator panel 14 coupled to a heat source. In another example, the collector plate 120 may be cooled by a radiator panel 14 (shown in FIG. 1) coupled to the collector plate 120.

The collector plate 120 may be electrically grounded to the spacecraft 10 to reduce the risk of electrical arcing of the collector plate 120. As shown in FIG. 3, the collector plate 120 is a flat surface. In other embodiments, the surface may be a curved, an undulating, or another type of surface. Additionally or alternatively, more than one collector plate 120 may be included in the contamination limiter 100.

In the embodiment of FIG. 3, the collimator 130 at the inlet at the contamination limiter 100 directs the VCMs to a central area 122 of the collector plate 120. A collimator 140 or nozzle is posited at the exterior vent 102 of the contamination limiter 100. Due to the collimators 130 and 140, the VCMs follow a flow path 150 from a central area 122 of a top surface of the collector plate 120 that is exposed to UV light, to the back surface of the collector plate 120, and to the exterior vent 102 to outer space. The collector plate 120 is positioned relative to the collimators 130, 140 to maximize the amount of VCMs contacting the collector plate 120 and polymerizing thereon. In the illustrated embodiment, the collector plate 120 is positioned in line between the collimators 130, 140 to force the flow path 150 of the VCMs to travel along surfaces of the collector plate 120, maximizing contact time between VCMs and the collector plate 120, while the VCMs are exposed to UV light. In one example, the contamination limiter 100 may have a reduced internal volume such that VCMs within the contamination limiter 100 are positioned in close proximity to the collector plate 120, thereby increasing the likelihood of condensing VCMs onto the collector plate. In such an embodiment, it is contemplated that a body 101 of the contamination limiter 100 may be formed from a UV transparent material (for example, a material that is 95 percent or greater optically transparent to light in the UV spectrum at a given wavelength or range of wavelengths). Examples of UV transparent materials include, but are not limited to, magnesium fluoride, calcium fluoride, quartz, and sapphire. In such an embodiment, the UV light sources 110 may be positioned outside a body of the contamination limiter 100, thereby allowing the internal volume to be further reduced. UV light may be directed toward the collector plate 120 from the externally-located UV light sources 110, through the optically-transparent body 101.

The gas conductance of the collimators 130 at the inlet and the collimators 140 at the exterior vent 102 may be the same or may be different to control the residence time of the VCMs across the top surface and/or bottom surface of the collector plate. In certain embodiments, the gas conductance of the collimators 130, 140 are designed so that the residence time of the VCMs across a surface/surfaces of the collector plate illuminated with UV light is about 80 minutes or more in space conditions. Outgassing of VCMs under space conditions is a slow low volume process occurring over the lifetime of the spacecraft 10. The rate of outgassing of VCMs is initially very high upon deployment of the spacecraft 10 in space conditions and then decays overtime during the lifetime of the spacecraft 10. A residence time of 80 minutes or more is sufficient for the UV light to cause photofixing of a majority of the VCMs to the collector plate 120. In some embodiments, it is contemplated that passive or active turbulence-inducing features may be provided within the contamination limiter 100, such that VCMs are agitated into contact with the collector plate 120 during the residence time, thereby improving VCM collection.

Figure 4:
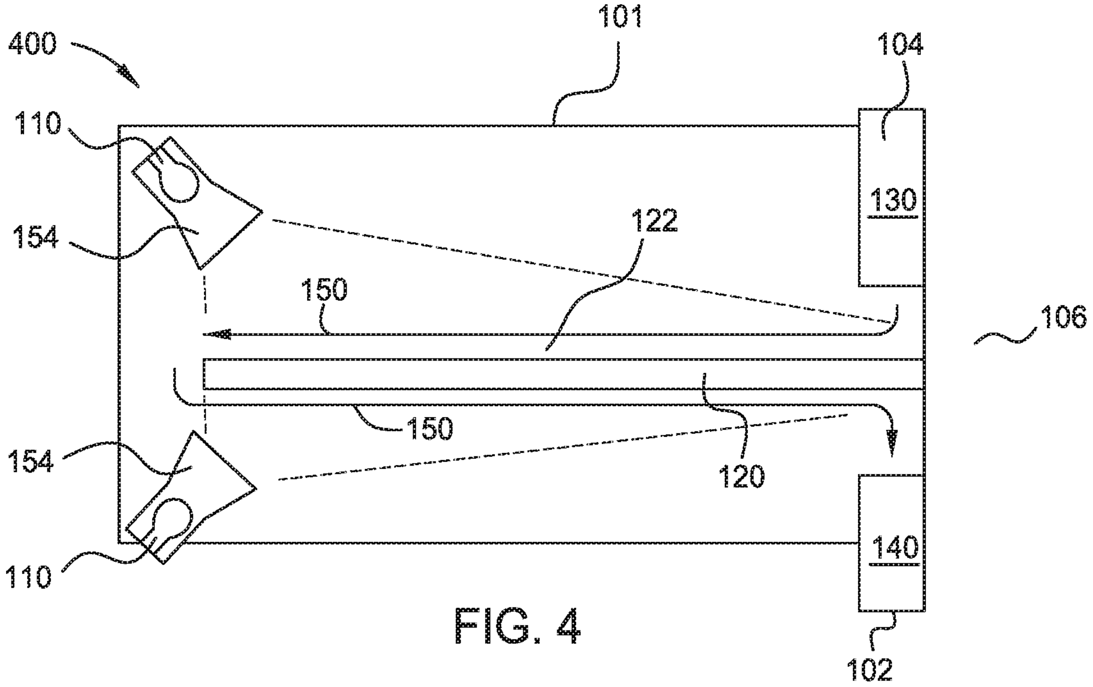
FIG. 4 is a schematic illustration of a cross-sectional view of another embodiment of a contamination limiter.

FIG. 4 is a schematic illustration of a cross-sectional view of another embodiment of a contamination limiter 400, which may be used in place of the contamination limiter 100 of FIG. 2. The contamination limiter 400 is similar to the contamination limiter 100 of FIG. 3 and like numerals for elements are used for ease of description.

The collimator 130 at the inlet 104 and the collimator 140 at the exterior vent 102 are disposed at one side 106 of the contamination limiter 400, e.g., off-center within the contamination limiter 400. The collimator 130 at the inlet of the contamination limiter 400 directs the VCMs to one side 106 of the contamination limiter 400. The VCMs follow a flow path 150 from side 106 of the contamination limiter 400 proximate the collimator 130 at the inlet 104. The flow path 150 continues across a top surface of the collector plate 120 and is exposed to UV light from one or more UV light sources 110 directed to the top surface of the collector plate. The collimator 140 at the exterior vent 102 directs the VCMs on the flow path 150 continuing across a bottom surface of the collector plate 120 and is exposed to UV light source 110 directed to the bottom surface of the collector plate 120. The flow path 150 continues to the exterior vent 102 to outer space.

In the embodiment as shown in FIG. 4, the residence time of the VCMs across the UV light exposed surface of the collector plate 120 is increased by having the flow path 150 across a full length of a top surface of the collector plate 120 and across a full length of a bottom surface of the collector plate 120. UV light sources 110 to the top surface of the collector plate 120 and to the bottom surface of the collector plate 120 cause photofixing of VCMs to both the top and bottom surfaces of the collector plate 120. While two UV light sources 110 are shown, it is contemplated that an array of UV light sources 110 may be utilized. In such an example, it is contemplated the each UV light source 110 in the array may have a uniform intensity of UV light, or that the UV light sources 110 in the array may have varying intensities. The varying intensities of the UV light sources 110 may be selected to provide a desired fixing profile of VCMs on the collector plate 120. The desired fixing profile may be selected to, for example, provide a more uniform deposition of material on the collector plate 120, or to preferentially fix more VCM material on certain areas of the collector plate 120, relative to other areas.

Figure 5:
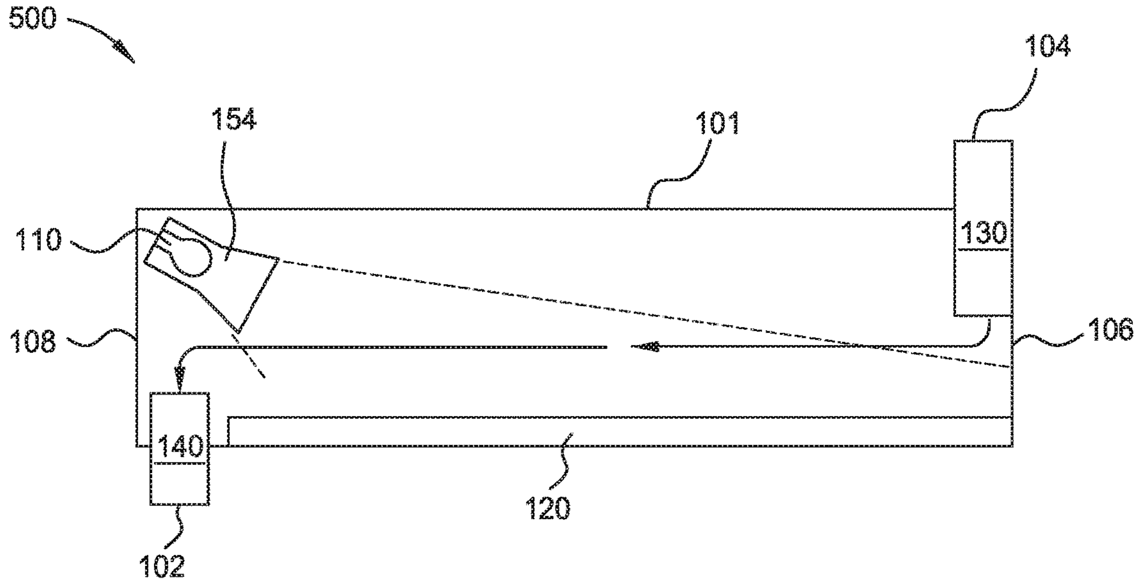
FIG. 5 is a schematic illustration of a cross-sectional view of still another embodiment of a contamination limiter.

FIG. 5 is a schematic illustration of a cross-sectional view of still another embodiment of a contamination limiter 500, which may be used in place of the contamination limiter 100 of FIG. 2. The contamination limiter 500 is similar to the contamination limiter 100 of FIG. 3 and/or the contamination limiter 400 of FIG. 4 and like numerals for elements are used for ease of description.

The collimator 130 at the inlet 104 is disposed at one side 106 of the contamination limiter 500 and the collimator 140 at the exterior vent 102 is disposed at the opposite side 108 of the contamination limiter 500. The collector plate 120 may be disposed proximate an exterior of the spacecraft, such as an exterior wall of the spacecraft 10 and/or coupled to a radiator panel 14 of the spacecraft 10 to enhance cooling of the collector plate 120. The collimator 130 at the inlet 104 and the collimator 140 at the exterior vent 102 directs the VCMs to follow a flow path 150 from side 106 of the contamination limiter 500 across a top surface of the collector plate 120 that is exposed to UV light from one or more UV light sources 110. Then, the flow path 150 continues to the exterior vent 102 to outer space.

In the embodiment as shown in FIG. 5, the residence time of the VCMs across the surface of the collector plate 120 of the contamination limiter 500 is increased (in comparison to the contamination limiter 100 of FIG. 3) by having the flow path 150 across a full length of a top surface of the collector plate 120. The length of the collector plate 120 may be selected to capture a predetermined amount of VCMs. The collector plate 120 disposed against an exterior wall of the spacecraft 10 and/or coupled to a radiator panel 14 of the spaced provides passive or active cooling to the collector plate 120.

Figure 6:
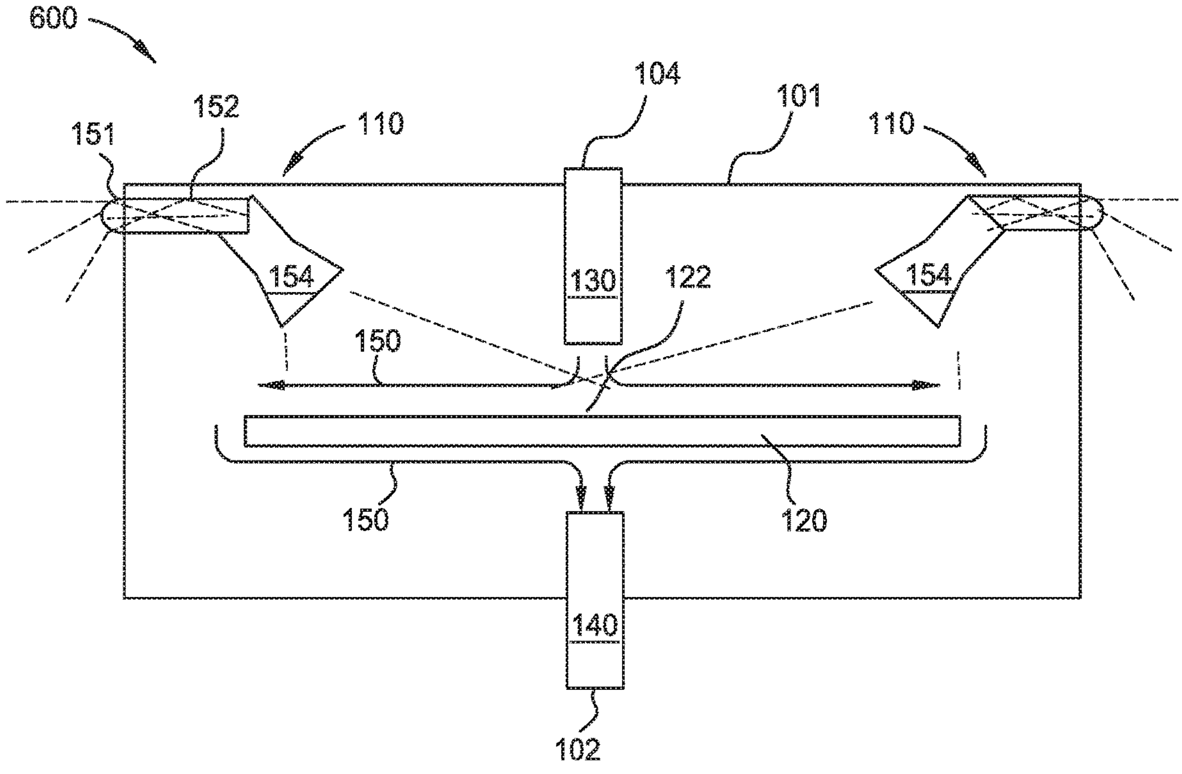
FIG. 6 is a schematic illustration of a cross-sectional view of yet another embodiment of a contamination limiter.

FIG. 6 is a schematic illustration of a cross-sectional view of yet another embodiment of a contamination limiter 600, which may be used in place of the contamination limiter 100 of FIG. 2. The contamination limiter 100 is similar to the contamination limiter 100 of FIG. 3, the contamination limiter 400 FIG. 4, and/or the contamination limiter 500 of FIG. 5 and like numerals for elements are used for ease of description.

The UV light source 110 may comprise a window 151 to an exterior of the spacecraft 10 to allow sunlight to pass through the window into the interior of the contamination limiter 600. The window 151 may be an opening, a UV transparent material fitted in a frame, or other object to allow UV light from the Sun to enter the contamination limiter 600. Examples of UV transparent materials include, but are not limited to, magnesium fluoride, calcium fluoride, quartz, and sapphire. The window 151 may be a dome to capture sunlight from incident rays at different angles due to the position of the Sun and the spacecraft 10. The window 151 may be coupled to a light tunnel 152 or a light guide that reflects UV into the interior of the contamination limiter. The UV light source 110 comprising a window 151 to an exterior of the spacecraft 10 can be used as the UV light source 110 of FIGS. 3-5 as well. The use of sunlight as the UV fixing energy eliminates the need for UV lamps, and thus, mitigates the likelihood of electrical or mechanical failure of the contamination limiter 600.

Figure 7:
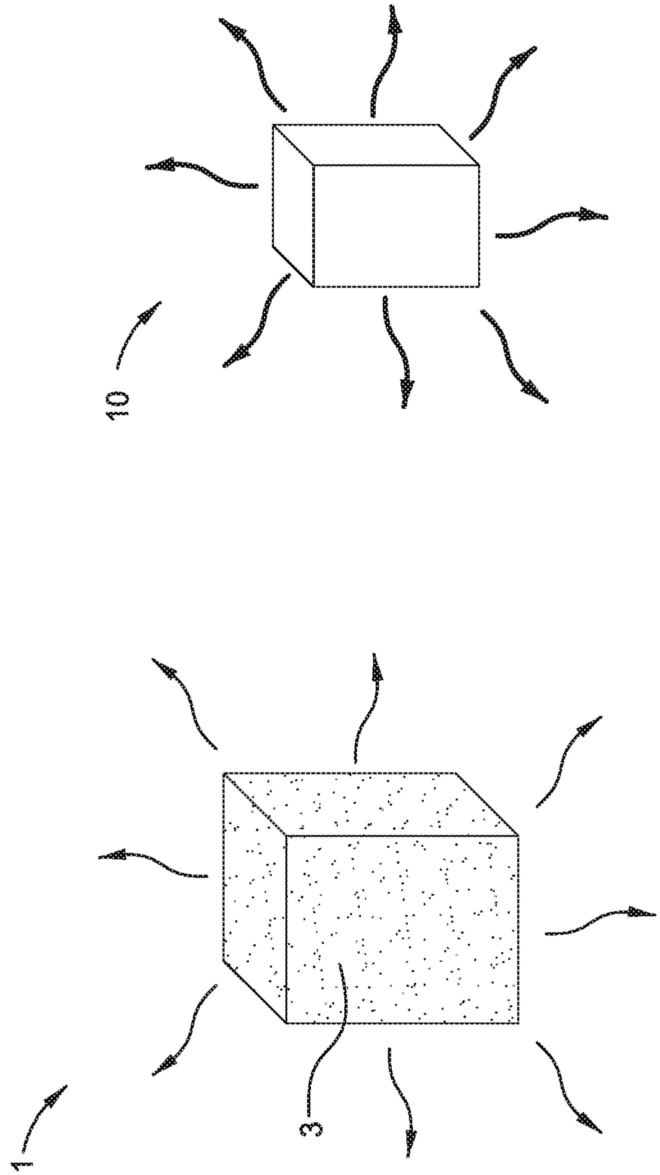
FIG. 7 is a schematic illustration of a three-dimensional view of certain embodiments of a spacecraft with a contamination limiter in comparison to a conventional spacecraft.

FIG. 7 is a schematic illustration of a three-dimensional view of certain embodiments of a spacecraft 10 with a contamination limiter, such as the contamination limiters 100, 400, 500, 600 of FIG. 2-6, in comparison to a conventional spacecraft 1. The deposition of VCMs 3 over thermal controlled surfaces (such as radiators, paint, thermal blankets, and/or mirrors) of the spacecraft 1 reduces the performance of the thermal controlled surfaces. These thermal controlled surfaces are used to reflect, radiate, and/or reject heat and solar radiation from the spacecraft 1. VCMs over the thermal controlled surfaces impact the thermal properties of the thermal controlled surfaces, such as lowering the emissivity of the thermal controlled surfaces and lowering the ability of the thermal controlled to reject heat. In the conventional spacecraft 1, the size of the spacecraft is overdesigned in order to account for the reduction in performance of the thermal controlled surfaces overtime due to VCM contamination. In regards to spacecraft 10, the contamination limiters 100, 400, 500, 600 reduce or eliminate deposition of VCMs on the surface of the thermal controlled surfaces enabling the thermal controlled surfaces to maintain their performance. Since the thermal controlled surfaces have reduced impact or no from VCMs, the spacecraft 10 may be reduced in size. A smaller spacecraft 10 reduces launch costs of the spacecraft 10 due to the reduction in size and/or mass of the spacecraft 10 when launched from a rocket, spacecraft bus, shuttle, or other space vehicle.

In certain embodiments, a contamination limiter reduces the amount of deposition of VCMs onto an exterior surface of the spacecraft. Deposition of VCMs onto an exterior surface of the spacecraft causes degradation to the performance and/or lifetime of the spacecraft. For example, deposition of VCMs over solar panels of the spacecraft reduces the electricity or efficiency of the solar panels by blocking sunlight to the panels. Therefore, the watt-hours generated by the solar panels are significantly reduced. The contamination limiter reduces the amount of deposition of VCMs on the surface of the solar panels enabling the solar panels to maintain their efficiency and to generate more electricity over the lifetime of the solar panels. The increased generation of electricity of the solar panels is more than the energy used to power the UV lamps of the contamination limiter. In another example, deposition of VCMs over instruments exposed to the exterior of the spacecraft of the spacecraft reduces the performance of the instruments limiting the lifetime of the spacecraft. The instruments may be used for a specific application of the spacecraft. VCMs over the instruments reduce the performance and lifetime of the instruments and thus reduce the performance and lifetime of the spacecraft. The contamination limiter reduces the amount of deposition of VCMs on the surface of the instruments to maintain performance and lifetime of the instruments and to maintain lifetime and performance of the spacecraft. In still another example, in conventional spacecrafts, the external vents of the spacecraft are positioned away from critical surfaces of the spacecraft to avoid VCM contamination. The contamination limiter allows greater design freedom to place an external vent with a contamination limiter in closer proximity to critical surfaces. In yet another example, in conventional spacecrafts, expensive organic materials approved by an appropriate space center or agency often must be used to limit the impact of outgassing VCMs. The contamination limiter allows a reduction in manufacturing costs of the spacecraft by permitting use additional types of organic materials which may not be space agency approved or may exhibit more outgassing of VCMs since VCM contamination is controlled or eliminated by the contamination limiter.

While the foregoing is directed to embodiments of the present disclosure, other and further embodiments of the disclosure may be devised without departing from the basic scope thereof, and the scope thereof is determined by the claims that follow.

What is claimed is:

1. A contamination limiter for a spacecraft, the contamination limiter comprising:

a body having an interior;

an inlet and exterior vent, both the inlet and exterior vent fluidly coupled to the interior of the body via an inlet collimator and an exterior vent collimator, the inlet collimator and exterior vent collimator defining a flow path of volatile condensable material (VCM);

a collector plate comprising embedded cooling channels and a nonporous upstream surface facing the inlet, the collector plate positioned within the interior of the body and relative the inlet collimator and exterior collimator to promote VCMs to contact the collector plate; and an ultraviolet (UV) light source directed at the upstream surface of the collector plate, the UV light source positioned within the interior of the body in a location upstream of the collector plate to promote adhesion of the VCMs to the collector plate.

2. The contamination limiter of claim 1, wherein the UV light source comprises a UV lamp.

3. The contamination limiter of claim 2, wherein the UV lamp operates in a power range from about 30 Watts to about 100 Watts.

4. The contamination limiter of claim 1, wherein the UV light source comprises a UV transparent window and a light tunnel coupled to the UV transparent window.

5. The contamination limiter of claim 1, wherein the collector plate is positioned in line between the inlet and the exterior vent.

6. The contamination limiter of claim 1, wherein the collector plate comprises a metal material.

7. The contamination limiter of claim 1, wherein the UV light source causes photofixing of the volatile condensable material to the surface of the collector plate.

8. The contamination limiter of claim 7, wherein the photofixing of VCMs to the collector plate is caused by UV light induced photolysis and excitement of the VCMs and reaction of the VCMs or polymer thereof to the surface of the collector plate.

9. The contamination limiter of claim 1, wherein the first inlet collimator and the exterior vent collimator define a flow path for a volatile condensable material from the interior of the body across the upstream surface of the collector plate.

10. The contamination limiter of claim 1, wherein the body comprises an optically transparent material.

11. The contamination limiter of claim 1, wherein the collector plate is roughened or textured to increase the surface area of the collector plate.

12. The contamination limiter of claim 1, further comprising one or more additional collector plates.

13. A spacecraft, comprising:

one or more interior compartments;

one or more electronic components disposed in the one or more interior compartments, the one or more electronic components outgassing a volatile condensable material (VCM) during space conditions; and a contamination limiter, comprising:

a body having an interior;

an inlet fluidly coupled to the interior of the body and fluidly coupled to the one or more interior compartments;

a collector plate comprising embedded cooling channels and a nonporous upstream surface facing the inlet and positioned within the interior of the body, the collector plate positioned against an exterior wall of the spacecraft;

an ultraviolet (UV) light source directed at a surface of the collector plate to photofix the VCM to the surface of the collector plate as polymerized VCMs thereon; and an exterior vent fluidly coupled to the interior of the body.

14. The spacecraft of claim 13, wherein the collector plate comprises aluminum.

15. The spacecraft of claim 13, wherein the contamination limiter comprises a UV-transparent window for directing UV light external of the spacecraft into the interior of the body.

16. The spacecraft of claim 13, wherein the collector plate is positioned in line between the inlet and the exterior vent.

17. The spacecraft of claim 13, wherein the UV light source is a UV lamp generating light having one or more wavelengths within a range of 10 nanometers to 400 nanometers.

18. The spacecraft of claim 13, further comprising a radiator panel coupled to the heat exchanger of the collector plate.

19. The spacecraft of claim 13, wherein the collector plate is electrically grounded to the spacecraft.

20. The spacecraft of claim 13, wherein the UV light source is a UV lamp generating light having one or more wavelengths within a range of 10 nanometers to 200 nanometers.

* * * * *

UNITED STATES PATENT AND TRADEMARK OFFICE

CERTIFICATE OF CORRECTION

PATENT NO. : 11,684,887 B2
APPLICATION NO. : 16/165752
DATED : June 27, 2023
INVENTOR(S) : Anthony Pang et al.

It is certified that error appears in the above-identified patent and that said Letters Patent is hereby corrected as shown below:

On the Title Page

In item (56), in Column 2, under “U.S. Patent Documents”, Line 6, delete “Meckier” and insert -- Meckler --.

In the Claims

In Column 10, Line 18, in Claim 9, delete “the first” and insert -- the --.

Signed and Sealed this
Twenty-eighth Day of November, 2023

Katherine Kelly Vidal

Katherine Kelly Vidal
*Director of the United States Patent and Trademark Office*